(12) United States Patent
Boers et al.

(10) Patent No.: US 8,243,643 B2
(45) Date of Patent: Aug. 14, 2012

(54) ACTIVE MULTICAST INFORMATION PROTOCOL

(75) Inventors: Arjen Boers, Sitges (ES); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 1295 days.

(21) Appl. No.: 11/046,629

(22) Filed: Jan. 28, 2005

(65) Prior Publication Data
US 2006/0159092 A1 Jul. 20, 2006

Related U.S. Application Data

(63) Continuation of application No. 11/038,437, filed on Jan. 19, 2005.

(51) Int. Cl.
*H04H 20/71* (2008.01)
(52) U.S. Cl. .................................................... 370/312
(58) Field of Classification Search ............... 370/390, 370/312
See application file for complete search history.

(56) References Cited

U.S. PATENT DOCUMENTS

| | | | | |
|---|---|---|---|---|
| 5,959,989 | A | 9/1999 | Gleeson et al. | 370/392 |
| 6,182,147 | B1 | 1/2001 | Farinacci | 709/238 |
| 6,317,434 | B1 | 11/2001 | Deng | 370/432 |
| 6,331,983 | B1 * | 12/2001 | Haggerty et al. | 370/400 |
| 6,457,059 | B1 | 9/2002 | Kobayashi | 709/242 |
| 6,597,703 | B1 | 7/2003 | Li et al. | 370/428 |
| 6,631,420 | B1 | 10/2003 | Li et al. | 709/242 |
| 6,633,765 | B1 | 10/2003 | Maggenti | 455/503 |
| 6,654,371 | B1 | 11/2003 | Dunstan et al. | 370/390 |
| 6,711,172 | B1 | 3/2004 | Li | 370/401 |
| 6,853,639 | B1 | 2/2005 | Watanuki et al. | 370/390 |
| 6,947,440 | B2 | 9/2005 | Chatterjee et al. | 370/390 |
| 6,963,573 | B1 | 11/2005 | Cain et al. | 370/401 |
| 6,970,461 | B2 | 11/2005 | Unitt et al. | 370/390 |
| 6,988,146 | B1 | 1/2006 | Magret et al. | 709/238 |
| 7,012,891 | B1 * | 3/2006 | Chandran et al. | 370/230 |
| 7,061,880 | B2 | 6/2006 | Basilier | 370/312 |

(Continued)

FOREIGN PATENT DOCUMENTS
AU 2003257074 6/2008
(Continued)

OTHER PUBLICATIONS

S. Deering, "RFC1112—Host Extensions for IP Multicasting," Internet RFC/STD/FYI/BCP Archives, Aug. 1989, pp. 1-13, http://www.faqs.org/rfcs/rfc1112.html.

(Continued)

*Primary Examiner* — Steven Lim
(74) *Attorney, Agent, or Firm* — Campbell Stephenson LLP (57) ABSTRACT

In the disclosed active multicast information protocol, a first edge router of a network receives a data packet from a source, wherein the data packet comprises data to be sent to receivers of a multicast group. The first edge router may rout the data packet to a first core router within the network. The first edge router also generates a message in response to receiving the data packet. This message is transmitted to the first core router within a network. The message includes an address of the source, but the message lacks data to be transmitted to the receivers of the multicast group. Another edge router stores the first multicast group and source addresses in an entry of a look-up table (LUT) in response to the edge router receiving a first message directly or indirectly from the first edge router.

29 Claims, 8 Drawing Sheets

U.S. PATENT DOCUMENTS

| | | | | |
|---|---|---|---|---|
| 7,233,987 | B2 | 6/2007 | Watkinson | 709/223 |
| 7,310,335 | B1 | 12/2007 | Garcia-Luna-Aceves et al. | 370/390 |
| 7,418,003 | B1 | 8/2008 | Alvarez et al. | 370/432 |
| 7,502,372 | B2 | 3/2009 | Tsuchiya et al. | 370/390 |
| 2002/0091926 | A1* | 7/2002 | Fukutomi | 713/170 |
| 2002/0191584 | A1* | 12/2002 | Korus et al. | 370/349 |
| 2003/0035398 | A1 | 2/2003 | Sato | 370/338 |
| 2004/0015583 | A1* | 1/2004 | Barrett et al. | 709/224 |
| 2004/0022244 | A1 | 2/2004 | Boers et al. | 370/390 |
| 2004/0100983 | A1 | 5/2004 | Suzuki | 370/432 |
| 2004/0122890 | A1 | 6/2004 | Watkinson | 709/203 |
| 2005/0076207 | A1 | 4/2005 | Park et al. | 713/163 |
| 2006/0062220 | A1 | 3/2006 | Suga | 370/392 |
| 2006/0088031 | A1 | 4/2006 | Nalawade | 370/390 |
| 2006/0133375 | A1 | 6/2006 | Napierala | 370/390 |

FOREIGN PATENT DOCUMENTS

| | | |
|---|---|---|
| CN | 0308018291.2 | 7/2003 |
| EP | 07122045.3 | 11/2007 |
| WO | WO 00/51370 A1 | 8/2000 |
| WO | WO 02/45334 A1 | 6/2002 |
| WO | WO 2004/012390 | 2/2004 |

OTHER PUBLICATIONS

"Stephen's Multicast Study: Protocol Independent Multicast (PIM)," NIST/ITL Advanced Network Technologies Division Software Distribution, Jun. 14, 1998, pp. 1-8, http://dns.antd.nist.gov/snad-staff/night/multicast/multpim.html.

"Source Specific Multicast (SSM) Homepage," Cisco IOS Software—IP Multicast Development & Dev/Test Groups, Nov. 29, 2000, pp. 1-6, ftp://ftpeng.cisco.com/ipmulticast/ssm/index.html.

H. Holbrook and B. Cain, "Source-Specific Multicast for IP," Internet Engineering Task Force (IETF), Nov. 21, 2001, pp. 1-14, http://www.ietf.org/internet-drafts/draft-ietf-ssm-arch-00.txt.

B. Haberman, "IGMPv3 and Multicast Routing Protocol Interaction," Internet Engineering Task Force (IETF), Feb. 2002, pp. 1-5, http://www.ietf.org/internet-drafts/draft-ietf-magma-igmpv3-and-routing-02.txt.

Supratik Bhattacharyya et al., "An Overview of Source-Specific Multicast (SSM)," Internet Engineering Task Force (IETF), Mar. 4, 2002, pp. 1-13, http://www.ietf.org/internet-drafts/draft-ietf-ssm-pverview-03.txt.

IP Multicast Technology Overview, Cisco Systems, Inc., Apr. 18, 2002, pp. 1-24, http://www.cisco.com/univercd/cc/td/doc/cisintwk/intsolns/mcst_sol/mcst_ovr.htm.

Brad Cain et al., "Internet Group Management Protocol, Version 3," Internet Engineering Task Force (IETF), May 2002, pp. 1-38.

Holbrook, Hugh W. and Cheriton, David R., "IP Multicast Channels: Express Support for Large-Scale Single-Source Applications," Computer Communications Review, Association for Computing Machinery, vol. 29, No. 4, Oct. 1999, pp. 65-78.

"Multicast Routing on the Internet," Multicast Communication, Protocols and Applications, May 12, 2000, pp. 105-121.

International Search Report as mailed from the PCT on Nov. 28, 2003, for counterpart WO Application (PCT/US03/23944; Filed Jul. 31, 2003), 7 pages.

Estrin, et al., "Protocol Independent Multicast-Sparse Mode (PIM-SM): Protocol Specification", Internet Draft of the IETF, Sep. 9, 1997, pp. 1-51.

* cited by examiner

| Entry | Validity | Source Address | Group Address |
|---|---|---|---|
| 1 | 1 | $SA_5$ | $GA_{80}$ |
| 2 | 1 | $SA_2$ | $GA_3$ |
| 3 | 0 | $SA_7$ | $GA_4$ |
| 4 | 1 | $SA_{40}$ | $GA_{16}$ |
| ⋮ | | | |
| n | 1 | $SA_1$ | $GA_1$ |

ACTIVE MULTICAST INFORMATION PROTOCOL

CROSS-REFERENCE TO RELATED APPLICATIONS

The present patent application is a continuation of U.S. patent application Ser. No. 11/038,437 filed on Jan. 19, 2005, entitled "Active Multicast Information Protocol" and is incorporated by reference herein in its entirety and for all purposes.

BACKGROUND

In packet-switched networks, a router is a device or, in some cases, software in a computer, that determines the next network point to which a data packet should be forwarded toward its destination. The router is typically coupled to at least two routers and decides which way to send each data packet based on its current understanding of the state of the network to which it is connected. A router may create or maintain a table (hereinafter a "routing table") of the available routes and their conditions and use this information along with distance and cost algorithms to determine the best route for a given data packet. Typically, a data packet may travel through a number of routers before arriving at its destination. Routing is a function associated with the network layer (i.e., layer 3) in the standard model of network programming, the Open Systems Interconnection (OSI) model.

Unicast, broadcast, and multicast are three well known techniques for transmitting data packets (e.g., audio and video data packets) from a source (e.g., a server) to one or more receivers (e.g., a desktop computer system) via packet-switched networks. Unicast is a point-to-point communication technique in which data packets are transmitted between a single source and a single receiver. Broadcast communication enables one source to transmit data packets to all receivers in a broadcast domain. Multicasting allows a source or several sources to transmit data packets simultaneously to select receivers, i.e., those receivers in a multicast group. During multicast transmission, multicast data packets are replicated by multicast enabled routers at the point where communication paths diverge to separate receivers of a multicast group. In this fashion, the multicast protocol delivers data to multiple receivers without burdening the source or consuming excessive network bandwidth.

There are several different multicast protocols, including but limited to Sparse Mode (SM) and Source Specific Mode (SSM). The SM protocol may be defined in Internet Engineering Task Force (IETF) Request For Comments (RFC) 2362 entitled "Protocol Independent Multicast-Sparse Mode (PIM-SM): Protocol Specification," published in June 1998, and hereby incorporated by reference in its entirety, or in revisions thereof. The SSM protocol may be defined RFC 3569 entitled "An Overview of Source-Specific Multicast (SSM)," published in July 2003, and hereby incorporated by reference in its entirety, or in revisions thereof.

Figure 1:
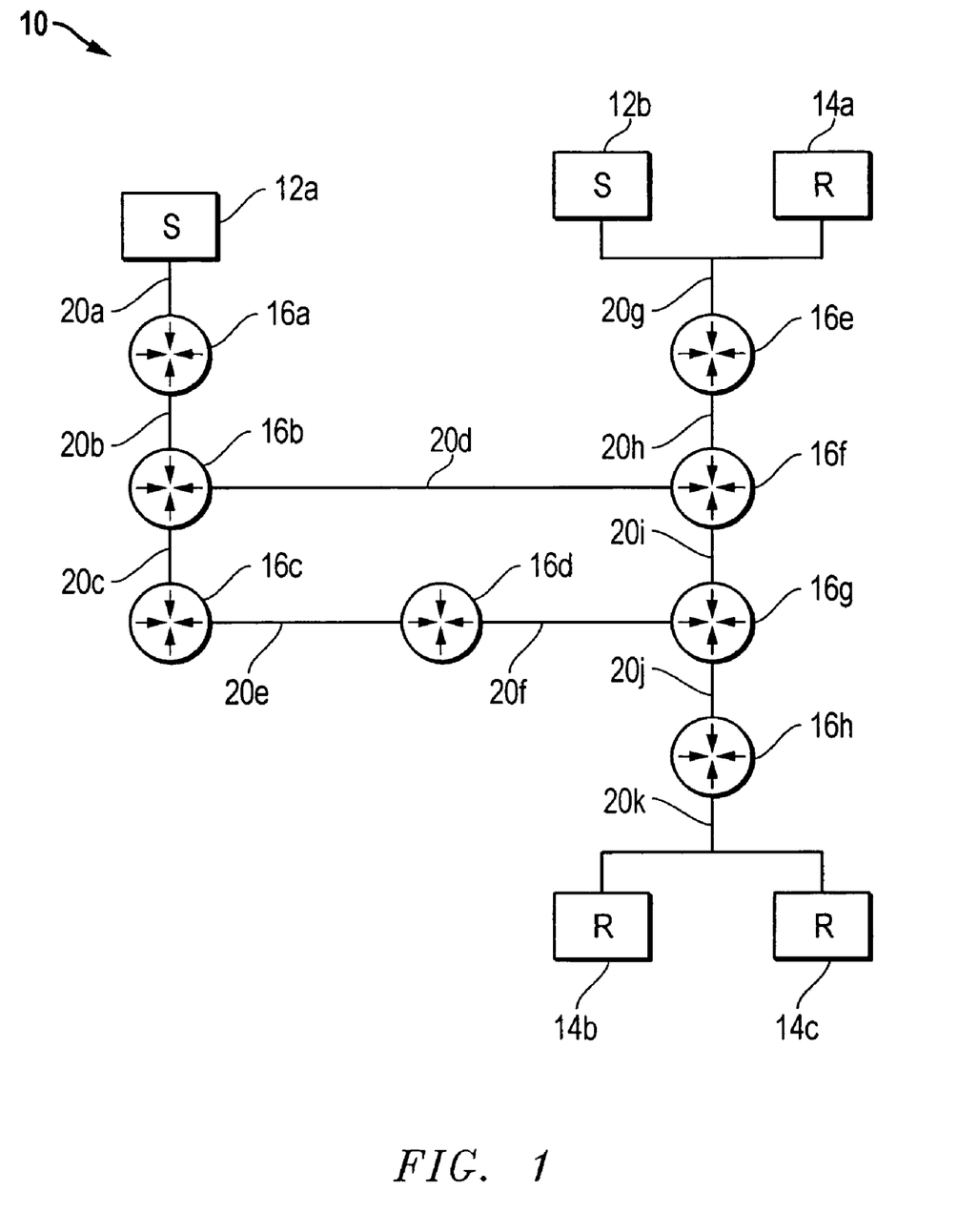
FIG. 1 is a block diagram illustrating relevant components of a packet-switched network.

FIG. 1 illustrates relevant components of a packet-switched network 10 that can employ either SM or SSM protocols. More particularly, FIG. 1 shows sources 12 coupled to receivers 14 (or potential receivers) via a series of routers 16 and data communication links 20. In SM networks, the various multicast enabled routers establish a default multicast distribution tree, referred to as a "shared tree," for each multicast group. The shared tree is rooted at a rendezvous point (RP) router that acts as the distribution point for multicast data transmitted to receivers of a multicast group. Before a source can begin transmitting data to receivers of a multicast group, the RP router must discover or learn about that source. The RP router learns of the source when the source first registers with the RP router. Moreover, for a receiver to join a multicast group, the receiver must join towards the RP router. Once a receiver joins a multicast group, the RP router establishes a communication path between one or more sources and the newly joined receiver.

To further illustrate, presume that router 16d is configured in network 10 as the RP router for a multicast group $G_1$ consisting of receivers 14a and 14b. Further, presume that device 14c seeks to join multicast group $G_1$ as a receiver. Device 14c can join the multicast group by first generating a membership report in compliance with Internet Management Group Protocol version 1 (IGMPv1) or Internet Management Group Protocol version 2 (IGMPv2). The address $G_1$ of the multicast group is included in the membership report along with the address (e.g., an Internet address) of device 14c. It is noted that IGMP is the terminology used in IPv4. In IPv6, IGMP is referred to as Multicast Listener Discovery (MLD). Thus, MLDv1 is the same as IGMPv2 and MLDv2 is the same as IGMPv3.

The IGMP membership report is transmitted by device 14c to edge router 16h via data communication link 20k. Edge router 16h, in response to receiving the IGMP report from device 14c, generates a request to join multicast group $G_1$. In SM networks, this request is designated PIM (*, $G_1$) JOIN, and its sent hop by hop towards RP router 16d. The "*" within the request indicates that the device (e.g., device 14c) seeking to join multicast group $G_1$ should receive data from all sources providing data to the multicast group $G_1$. Thus, if sources 12a and 12b are providing data to receivers within the multicast group $G_1$, device 14c will receive data from both sources 12a and 12b once device 14c joins multicast group $G_1$ as a receiver. For purposes of explanation, it will be presumed that device 12a is the only source providing data to multicast group $G_1$.

The PIM (*, $G_1$) JOIN is transmitted by edge router 16h to RP router 16d. RP router 16d, in response to receiving PIM (*, $G_1$) JOIN, accesses at table to learn the identity (e.g., addresses) of sources transmitting data to multicast group $G_1$. Once the source identities are known, RP router 16d creates a communication path between the sources and device 14c. For purposes of explanation, it will be presumed that the table in RP router 16d indicates that only source 12a is transmitting data to multicast group $G_1$. Accordingly, RP router 16d creates a communication path between source 12a and device 14c that includes RP router 16d. Device 14c receives data packets from source 12 once this communication path is established.

After the communication path is established between source device 12a and receiver 14c, edge router 16h may trigger a routine to create a faster and/or more efficient communication path between source 12a and receiver 14c that may not include RP router 16d. The new and more efficient communication path between source 12a and receiver 14c is often referred to as a source specific multicast tree. Once the new and more efficient communication path is established, the original communication path though RP router 16d is pruned away. Unfortunately, the creation of a new and more efficient source specific multicast tree and the subsequent pruning of the original communication path, adds complexity to the overall operation of network 10.

As noted above, network 10 may also operate according to the SSM protocol. Unlike an SM network, an SSM network does not employ an RP router. In SSM protocol networks, when a device seeks to join a multicast group as a receiver, the device will know in advance the identity of the source or sources from which it seeks to receive multicast data. This enables a new receiver to directly join a multicast group on the shortest path tree towards the source or sources (i.e., without first going through an RP router). When more than one source is transmitting data packets to a multicast group, SSM networks enable multicast group receivers to select one or more the sources from which to receive data. Compared to the SM protocol, the SSM protocol is more efficient.

To illustrate operational aspects of SSM protocol, presume that network 10 operates according to the SSM protocol, and that devices 14a and 14b are receiver members of a multicast group $G_2$ that receive data from source 12a. Further, presume that device 14c seeks to join multicast group $G_2$ as a new receiver. Typically, before device 14c can join multicast group $G_2$, device 14b must generate a membership report using IGMP version 3 (IGMPv3) protocol. It is noted that device 14c can join multicast group $G_2$ as a receiver even though device 14c executes only IGMPv1 or IGMPv2 if device 14c and/or edge router 16h implement the method described in U.S. patent application Ser. No. 10/208,977 entitled "Source Specific Multicast Group to Source Mapping," filed on Jul. 31, 2002. The foregoing patent application is incorporated herein by reference in its entirety. However, for purposes of explanation, it will be presumed that device 14c operates according to IGMPv3 only.

The IGMPv3 membership report identifies both the source device 12a and the multicast group that device 14c wishes to join. In contrast, the IGMPv1 or IGMPv2 membership report generated for the SM protocol does not identify the source from which data is sought. The IGMPv3 report generated by device 14c is transmitted to edge router 16h. Thereafter edge router 16h establishes a fast and efficient communication path between source device 12a and device 14c which does not include router 16d, but which may include routers 16a, 16b, 16f, 16g, and 16h. With this communication path established, source device 12a transmits data to receiver device 14c while also transmitting data to the other receivers in multicast group $G_2$.

As noted, traditional SM networks require an RP router for source discovery. However, for some SM networks, the existence of an RP router is not desired. A mobile network in which routers are mobile and in data communication with each other via wireless communication network, is one example where the existence of an RP router is not desired. One reason an RP routers is not desired in a mobile network is that it is not known in advance which routers in the network will be active. In order to guarantee operation in a mobile network that employs SM protocol, each router must be able to operate as an RP router. This may also lead to the added difficulty that it is not known which router will act as the active RP at a given point in time. This causes operational problems in the field, since network operators want the network to be predictable. Accordingly, a need exists for an invention that enables communication in an SM network that lacks an RP router.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention is directed to a method, apparatus, or instructions that when executed by one or more processors, enables a device to join a multicast group as a receiver in an SM protocol network that lacks an RP router. The present invention can be employed in a network operating under any one of several distinct versions of Internet Protocol (IP) including IP versions 4 or 6. The present invention will be described with reference to an SM network 30 shown in FIG. 2. It is noted that the present invention can be employed in a network other than that described and shown in FIG. 2

Figure 2:
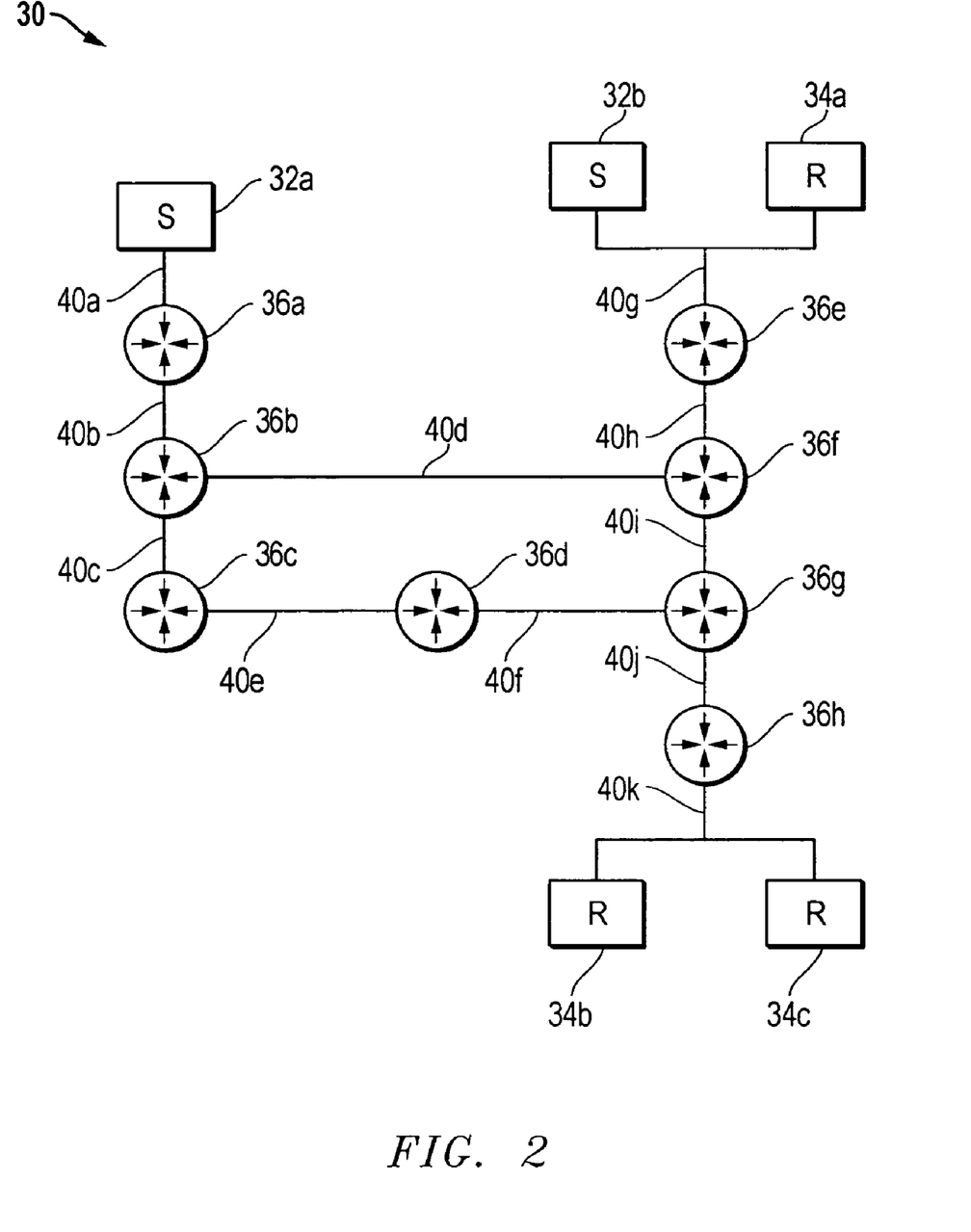
FIG. 2 is a block diagram illustrating relevant components of a packet switched network employing one embodiment of the present invention.

Network 30 includes sources 32 coupled to devices 34 via a series of routers 36 and data communication links 40. For purposes of explanation, devices 34 are receiver members of a multicast group, or devices which seek to join a multicast group as a receiver. All, some, or none of communication links 40 may be wireless communication links. Network 30 does not include an RP router or a router that is configured to operate as an RP router. Network 30 does include three edge routers 36a, 36e, and 36h. An edge router is a router that interfaces a source or a receiver. In other words, edge routers are coupled to a source and/or receiver (or a device seeking to join a multicast group as a receiver) without an intervening router. For example, router 36a is an edge router because there is no other router connected between it and source 32a. Network 30 also includes core routers 36b-36c, 36f, and 36g. A core router is a router that has no sources or receivers coupled directly to it, it only acts as transit for other routers. Each of the routers 36a-36h includes one or more processors which can execute instructions stored within memory (not shown). Additionally, each of the routers 36a-36h includes memory with information identifying the router as an edge router or a core router.

Some or all of the edge routers of FIG. 2 are configured to discover active sources coupled thereto in accordance with one embodiment of the present invention. For purposes of explanation, an active source is a source which is actively transmitting multicast data packets to one or more receivers of a multicast group. For purposes of explanation only, the present invention will be described with reference to source 32a transmitting data packets to receivers of a multicast group $G_1$. Accordingly, source 32a is an active source. Because edge routers of FIG. 2 can discover active sources as will be more fully described below, the active sources of network 30 need not register with an RP router.

Edge routers, such as edge router 36a, discover active sources, such as source 32a, by analyzing data packets transmitted therefrom. Once discovered, edge router 36a alerts other edge routers about the existence of the active source. In one embodiment, edge router 36a can alert the other edge routers by flooding network 30 with active source messages. These active source messages contain information (e.g., addresses of active source 32a and/or the multicast group $G_1$ to which the active source is transmitting data packets) unique to the active source. Eventually other edge routers receive the active source message, and store information such as the source and multicast group addresses contained within the active source messages into entries of an active source look-up table. The active source look-up tables enable edge routers to establish a source specific tree between sources and devices seeking to join multicast groups.

When a device seeks to join a multicast group as a receiver, the device can transmit an IGMP membership report to an edge router coupled thereto. The IGMP membership report generated by the device contains the address of the multicast group to be joined, but lacks the address of the source that transmits data packets to the multicast group. The edge router accesses its active source look-up table using the address of the multicast group contained within the IGMP membership report. The active source look-up table in turn returns the address of the source that provides data packets to the multicast group. Because the edge router that receives the IGMP membership report has the addresses of the multicast group and the source which provides data packets to this multicast group, the edge router can initiate the creation of a communication tree between the source and the device seeking to join the multicast group as a receiver without having to go through an RP router. In one embodiment, the edge router can initiate the creation of the communication path or tree using a PIM request to join which includes both the address of the multicast group contained within the IGMP membership report and the corresponding source address returned from the active source look-up table. A more detailed discussion is provided below.

Figure 3:
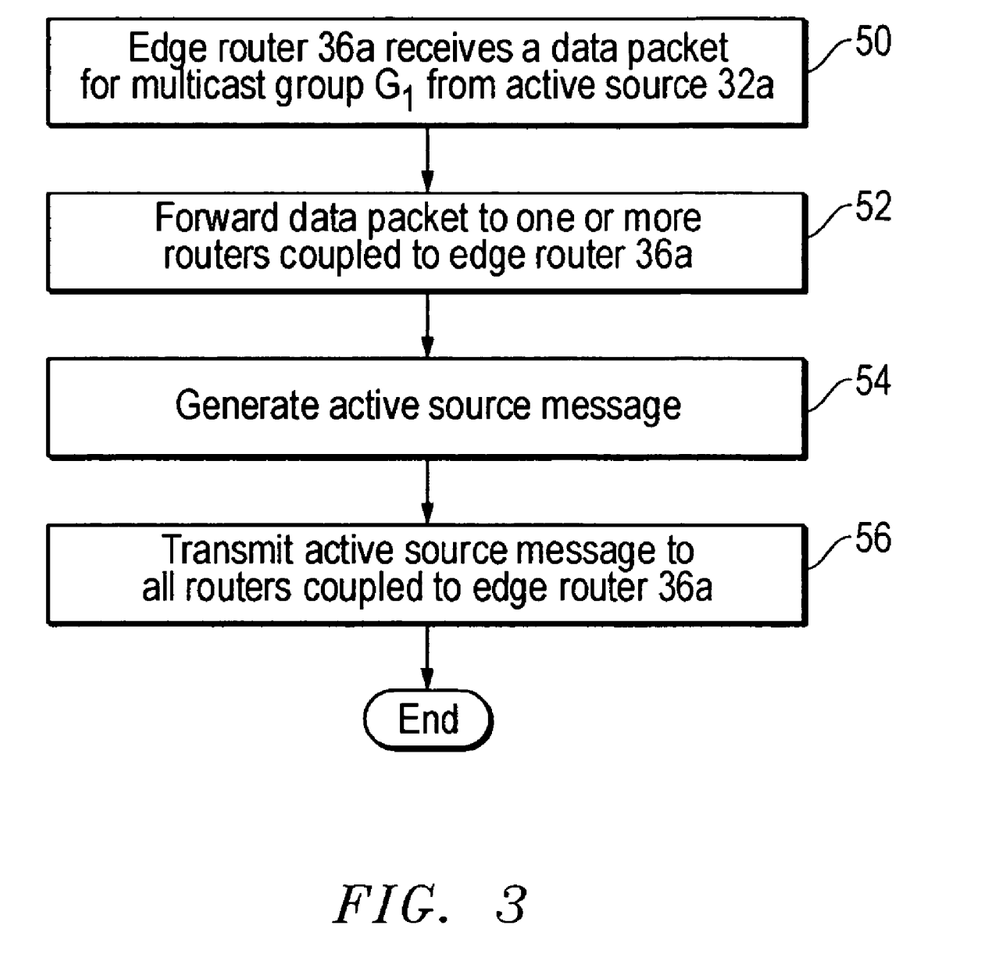
FIG. 3 illustrates relevant operational aspects performed by an edge router in the network of FIG. 2 in response to receiving data packets from an active source.

Edge routers discover or confirm the continued existence of active sources when the edge routers receive multicast data packets from the active sources. FIG. 3 illustrates operational aspects of a method for discovering or confirming the continued existence of an active source according to one embodiment of the present invention. The method of FIG. 3 will be described with reference to edge router 36a coupled to active source 32a. More particularly, edge router 36a receives from active source 32a a data packet destined for a multicast group $G_1$, as shown in step 50. Edge router 36a then accesses a routing table (not shown) to identify one or more routers of network 30 to which the data packet should be forwarded to reach the existing receivers of multicast group $G_1$. Edge router 36a forwards or routes the data packet received from active source 32a to one or more routers coupled thereto in accordance with information from the routing table as shown in step 52. Given that core router 36b is the only router coupled to edge router 36a in the illustrated example, edge router 36a routes the data packet to only core router 36b in the illustrated example. Keep in mind here that edge router 36a may also not forward the data packet at all. If this is the first packet that the source sends, edge router 36a will only send out the active source message. Then depending if other edge routers join this source a forwarding tree will be established and subsequent packets will be forwarded to one or more other routers.

Also in response to receiving the data packet from active source 32a, edge router 36a generates an active source message. The active source message generated in step 54 may be one of several active source messages generated by edge router 36a after source 32a begins transmitting data packets to multicast group $G_1$. The active source message generated in step 54 includes the address identifying active source 32a and/or the address identifying multicast group $G_1$ to which active source 32a is transmitting data packets. The active source message may also include additional information which will be more fully described below. The active source message, as shown in step 56, is transmitted to all routers coupled to edge router 36a. Given that core router 36b is the only router coupled to edge router 36a, it follows that edge router 36a transmits the active source message only to core router 36 in this exemplary embodiment.

Since router 36b is designated a core router, core router 36b RPF floods network 30 with the active source message it receives. In RPF flooding, core routers forward a copy of the active source message to each router coupled thereto, except for the router from which the active source message was received. Accordingly, in the illustrated example, core router 36b forwards the active source message generated in step 54 to only core routers 36f and 36c.

Figure 4:
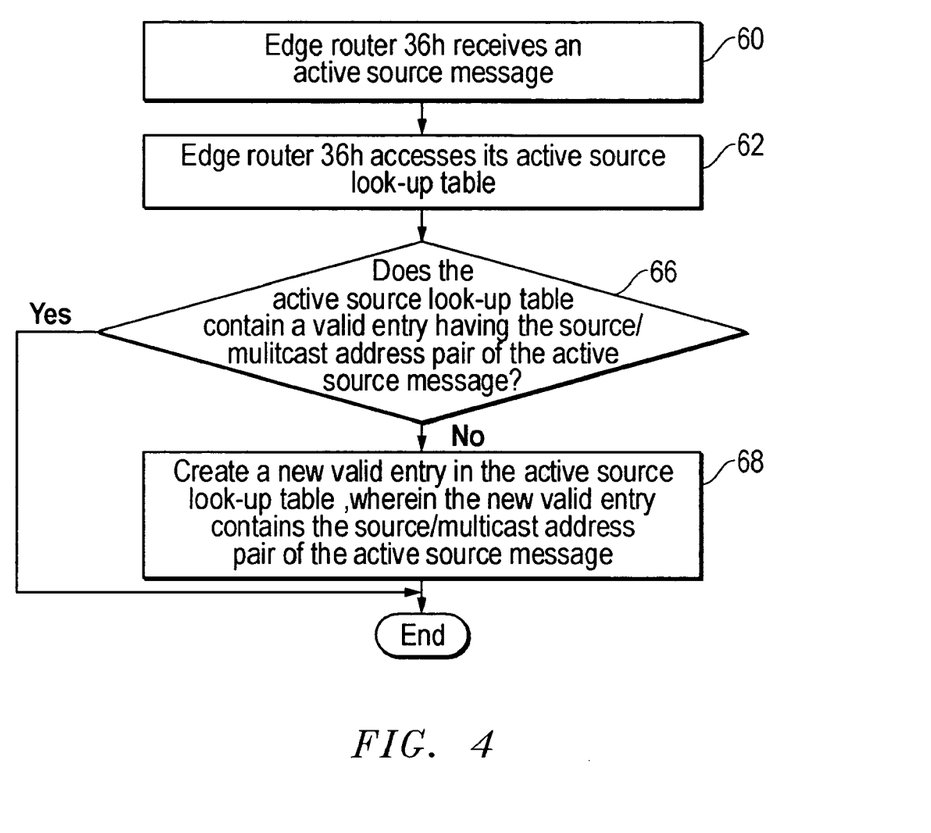
FIG. 4 illustrates relevant operational aspects performed by an edge router in the network of FIG. 2 in response to receiving an active source message.
Figure 5:
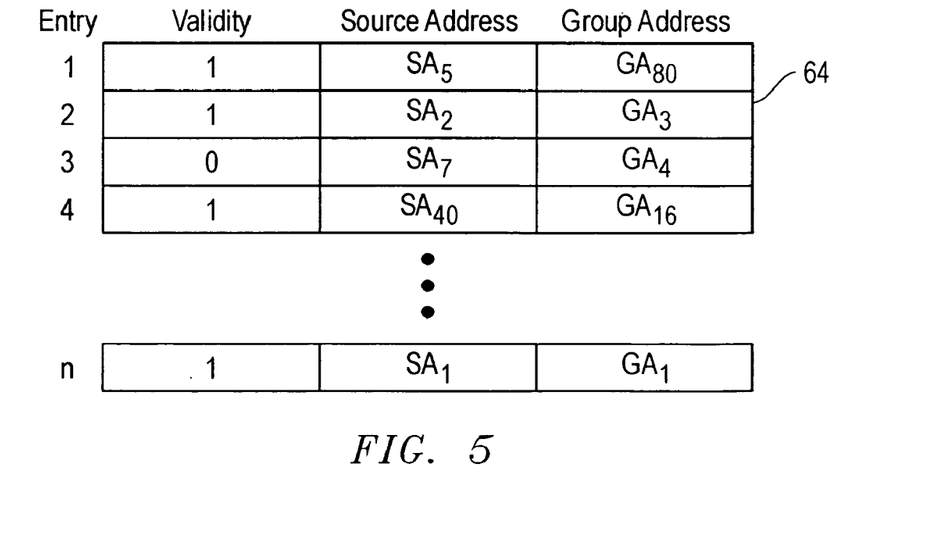
FIG. 5 is a block diagram representation of a typical active source look-up table.

Eventually, through RPF flooding, edge routers 36b and 36h receive a copy of the active source message initially generated by edge router 36a in step 54 of FIG. 3. Edge routers, in response to receiving an active source message, may update their active source look-up tables with the source and multicast group addresses contained in the received active source message. To illustrate, FIG. 4 shows operational aspects of a method performed by edge router 36h in response to receiving the active source message generated in step 54 of FIG. 3. It is noted that edge router 36e may also implement the method shown within FIG. 4. Edge router 36h, in step 62, accesses its active source look-up table in response to receiving the active source message directly or indirectly from edge router 36a. FIG. 5 illustrates an exemplary active source look-up table 64 accessible by edge router 36a. As can be seen, active source look-up table includes multiple entries, each one of which contains a validity bit and corresponding source and multicast addresses. The validity bit is set to logical 1 if the entry is considered valid. Otherwise, the entry is considered invalid.

The edge router 36h accesses its active source look-up table to determine whether it contains a valid entry containing the source and multicast group addresses of the active source message received in step 60. If it is determined in step 66 that the active source look-up table does not contain a valid entry having the source/multicast group addresses, then edge router 36h creates a new valid entry having the source/multicast group address pair of the active source message received in step 60. It is noted that a new valid entry can be created in the active source look-up table simply by validating an otherwise invalid entry in the look-up table that contains the source/multicast address pair. If edge router 36a determines in step 66 that its look-up table contains a valid entry having the source/multicast address pair, the process of FIG. 4 ends.

Figure 6:
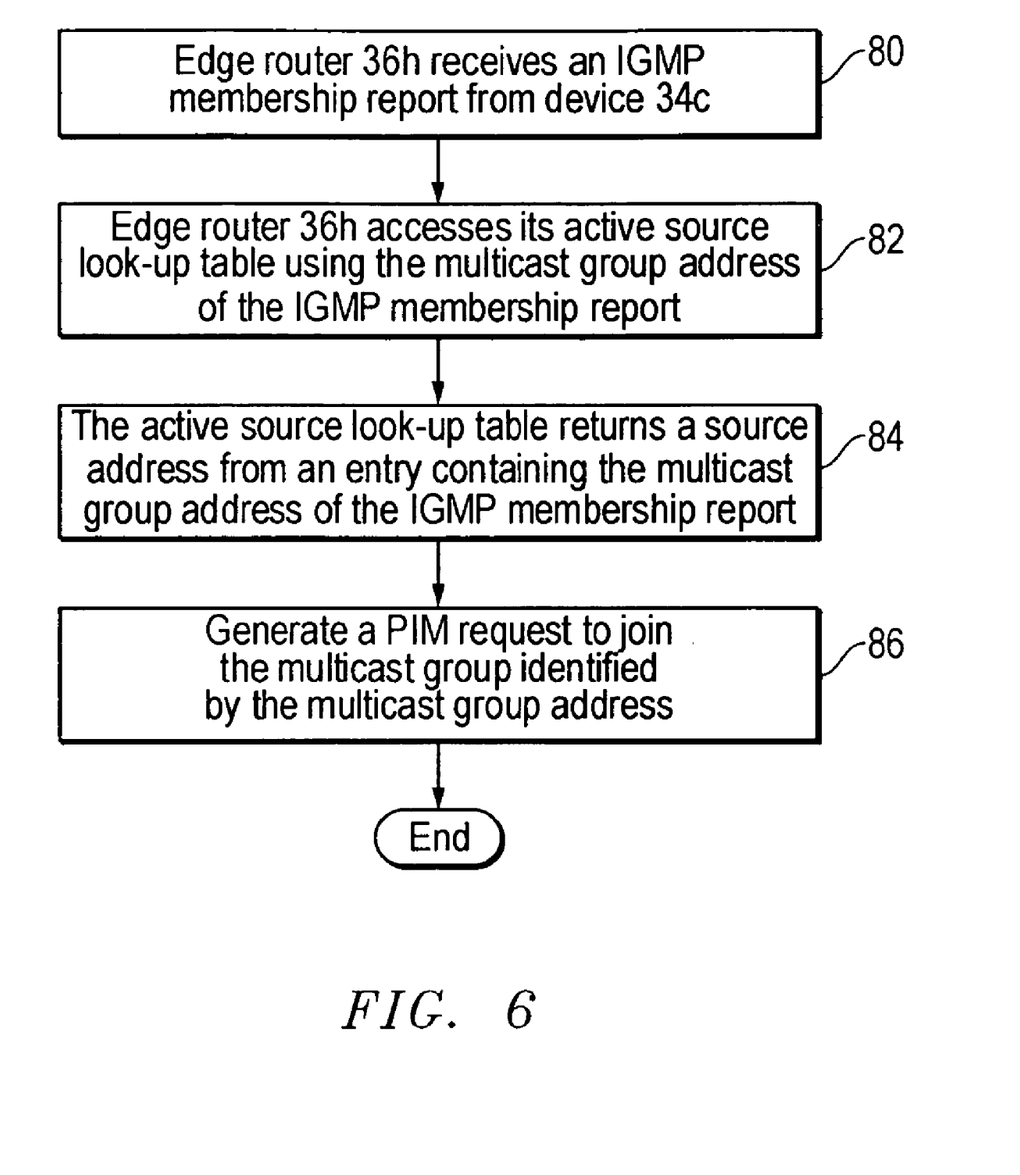
FIG. 6 illustrates relevant operational aspects performed by an edge router in the network of FIG. 2 in response to receiving an IGMP membership report from a device coupled to the edge router.

Active source look-up tables within edge routers enable the creation of a communication path in an SM network between a source and a device seeking to join a multicast group to which the source transmits data, notwithstanding the lack of an RP router within the SM network. To illustrate, presume that device 34c in FIG. 2 seeks to join the multicast group $G_1$ as a receiver. FIG. 6 illustrates relevant operational aspects of a method performed by edge routers, such as edge router 36h, in response to receiving an IGMP membership report or other request to join a multicast group such as multicast group $G_1$. As noted in step 80 of FIG. 6, edge router 36h receives an IGMP membership report or other request from device 34c. This membership report includes the address (e.g., $GA_1$) of the multicast group $G_1$ that device 34c seeks to join as a receiver. In response, edge router 36h accesses its local active source look-up table using the multicast group address $GA_1$ of the IGMP membership. All of the edge routers of network 30 should contain or have access to its own active source look-up table. The contents of the various active source look-up tables should be identical.

In step 84, the active source look-up table returns a corresponding source address (e.g. $SA_1$) of the source 32a that transmits data to group $G_1$. In step 86, edge router 36h generates a PIM request to join the multicast group $G_1$. This PIM request to join includes the address $GA_1$ of the multicast group and the address $SA_1$ returned from the active source look-up table. Edge router 36h transmits the PIM request to join, which in turn, initiates the creation of the communication path from source 32a and device 34c.

Employing the principles set forth in FIG. 3-6, the basic principles of PIM sparse mode operations can occur within an SM network lacking an RP router. Further, employing the principles of the invention described with reference to FIGS. 2-6, no shared trees need be used when a device seeks to join a multicast group as a receiver. Only edge routers must maintain the list of active sources in the network. Core routers can choose only to flood the active source messages originating from the edge routers coupled to active sources. Using the invention, there is no single router within network 30 which can be a point of failure, nor is there a single router (e.g., an RP router) which must carry the load of identifying all the active sources.

The active source look-up tables (e.g., look-up table 64 of FIG. 5) are used to maintain a listing of active sources within network 30. When a source deactivates (i.e., terminates the sending of packets to a multicast group of receivers), all active source look-up tables should be updated accordingly. In other words, entries in the active source look-up tables should be removed or otherwise invalidated when corresponding sources stop transmitting data packets to their respective multicast group receivers. There are several methods for maintaining the active source look-up tables. In one method, an active source message generated by edge router 36a during the process of FIG. 3 may include a hold of time value. The hold time value defines a length of time the source will transmit data packets to its multicast receivers. Thus, the hold time defines the length of time the source/multicast group address pair of the message should be stored in a valid entry of an active look-up table. The edge router that receives the active source message and subsequently creates an entry in its active source look-up tables, will maintain the entry as valid until expiration of the hold time value.

Figure 7:
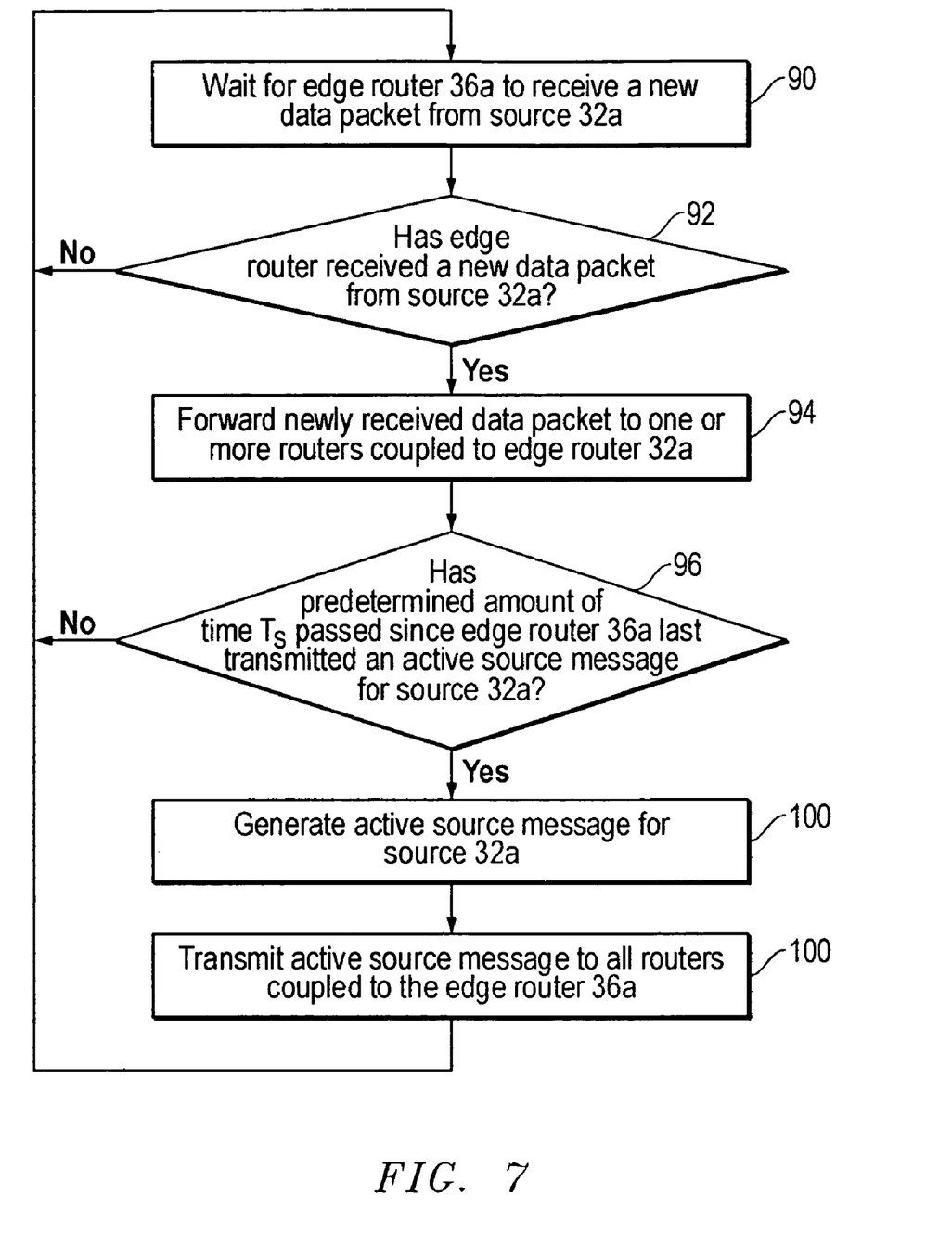
FIG. 7 illustrates relevant operational aspects performed by an edge router coupled to an active source.
Figure 8:
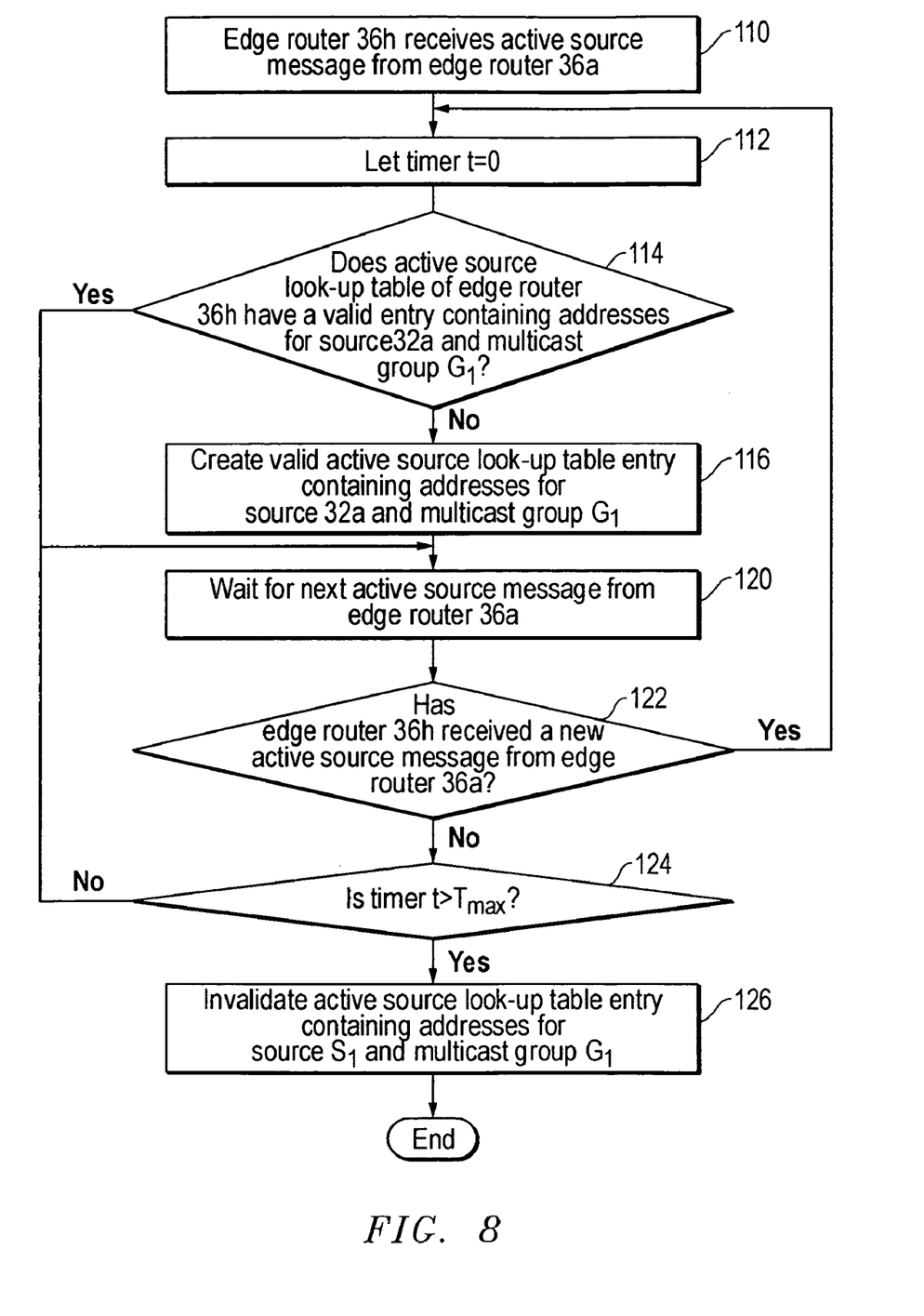
FIG. 8 illustrates relevant operational aspects performed by an edge router in the network of FIG. 2 in maintaining its local active source look-up table.

FIGS. 7 and 8 illustrate an alternative method of maintaining the active source look-up tables. The alternative method of FIG. 7 will be described with reference to edge routers 36a, it being understood that other edge routers can function similarly. This alternative method does not require additional information such as the hold time value described above, to be included within active source messages. In steps 90 and 92 of FIG. 7, edge router 36a operates in a wait mode until it receives a new data packet from source 32a for multicast group $G_1$, thus indicating initial or continued transmission of data packets to the multicast group of receivers. Once a new data packet is received from source 32a, edge router forwards the newly received data packet to one or more routers in accordance with a routing table. Thereafter, edge router 36a determines whether a predetermined amount of time Ts has passed since edge router 36a last transmitted an active source message that contains address $SA_1$ of source 32a and address $GA_1$ of the multicast group $G_1$ to which source 32a is transmitting data. If the predetermined amount of time Ts has passed, the process proceeds to step 100, and edge router 36a generates a new active source message containing addresses $SA_1$ and $GA_1$. The active source message generated in step 100 is transmitted through out network 30 using RPF flooding. If, however, it is determined in step 96 that a predetermined amount of time Ts has not passed since edge router 36a transmitted an active source message, then edge router 36a reenters the wait mode of steps 90 and 92.

FIG. 8 illustrates relevant operational aspects of a method implemented by the edge routers to maintain their active source look-up tables. The alternative method of FIG. 8 will be described with reference to edge routers 36h, it being understood that other edge routers can function similarly. The process in FIG. 8 begins with step 110 when edge router 36h receives an active source message from edge router 36a. Again, this active source message includes the addresses $SA_1$ and $GA_1$ of active source 32a and multicast group $G_1$, respectively. In response to receiving the active source message, edge router 36h in step 112 sets a timer t to zero. Timer t advances in time just after it is set to zero. Thereafter in step 114 edge router 36h accesses its local active source look-up table to determine whether it has a valid entry containing addresses $SA_1$ and $GA_1$ for the source and multicast group, respectively, identified in the message received in step 110. Presuming that no such valid entry is contained within the look-up table, edge router 36h creates a new valid entry containing the addresses $SA_1$ and $GA_1$. Edge router 36h then enters a wait mode for the next active source message from edge router 36a that contains addresses $SA_1$ and $GA_1$.

During the wait mode of steps 120-124, edge router 36h frequently compares timer t with $T_{max}$, a predetermined amount of time. In step 124, if timer t is greater in time than $T_{max}$, 116 edge router 36h invalidates or removes the look-up table entry created in step 116 under the presumption that source 32a is no longer active. However, during the wait mode, if edge router receives a new active source message from edge router 36a before timer t exceeds the value of $T_{max}$, then the process returns to step 112 whereby timer t is reset to 0. As a result of the process shown in FIG. 8, edge router 36h invalidates or removes entries within the active source look-up table after a source deactivates.

It is noted that the processes in FIGS. 7 and 8 are paired and correspond to one active source (i.e., source 32a). However, the same processes can be used to maintain each entry of the active look-up tables. Thus several instances of the process shown in FIG. 7 can be running at any given point in time on edge router 36a, where each of the individual processes correspond to a distinct active source coupled to edge router 36a. Further, several instances of the process shown in FIG. 8 can be running at any given point in time on edge router 36h, where each of these individual processes correspond to a distinct entry within the active source look-up table that is local to edge router 36a.

As noted above, additional information can be added to the active source message other than hold time values, active source addresses, or multicast group addresses. For example, the active source messages generated by edge router 36a may include a bandwidth value identifying the bandwidth needed to transmit data packets from an active source. Intermediate routers may decide not to flood this message if they know that the bandwidth contained within the active source message is not available on the data communication links between it and, for example, an edge router coupled thereto. The bandwidth value may also be used by the resource reservation protocol (RSVP) to set up a traffic engineered communication path to the corresponding active source. In addition to a bandwidth value, the active source message may also include a table distinguisher. Routers within the network may have several distinct routing tables to use when making a packet routing decision. Routers joining to the corresponding active source can use the table distinguisher to select one of a plurality of routing tables for reverse path forwarding (RSP). The active source message may also include a public key identifier that is needed to decrypt data contained within packets or to provide user level access control.

Figure 9:
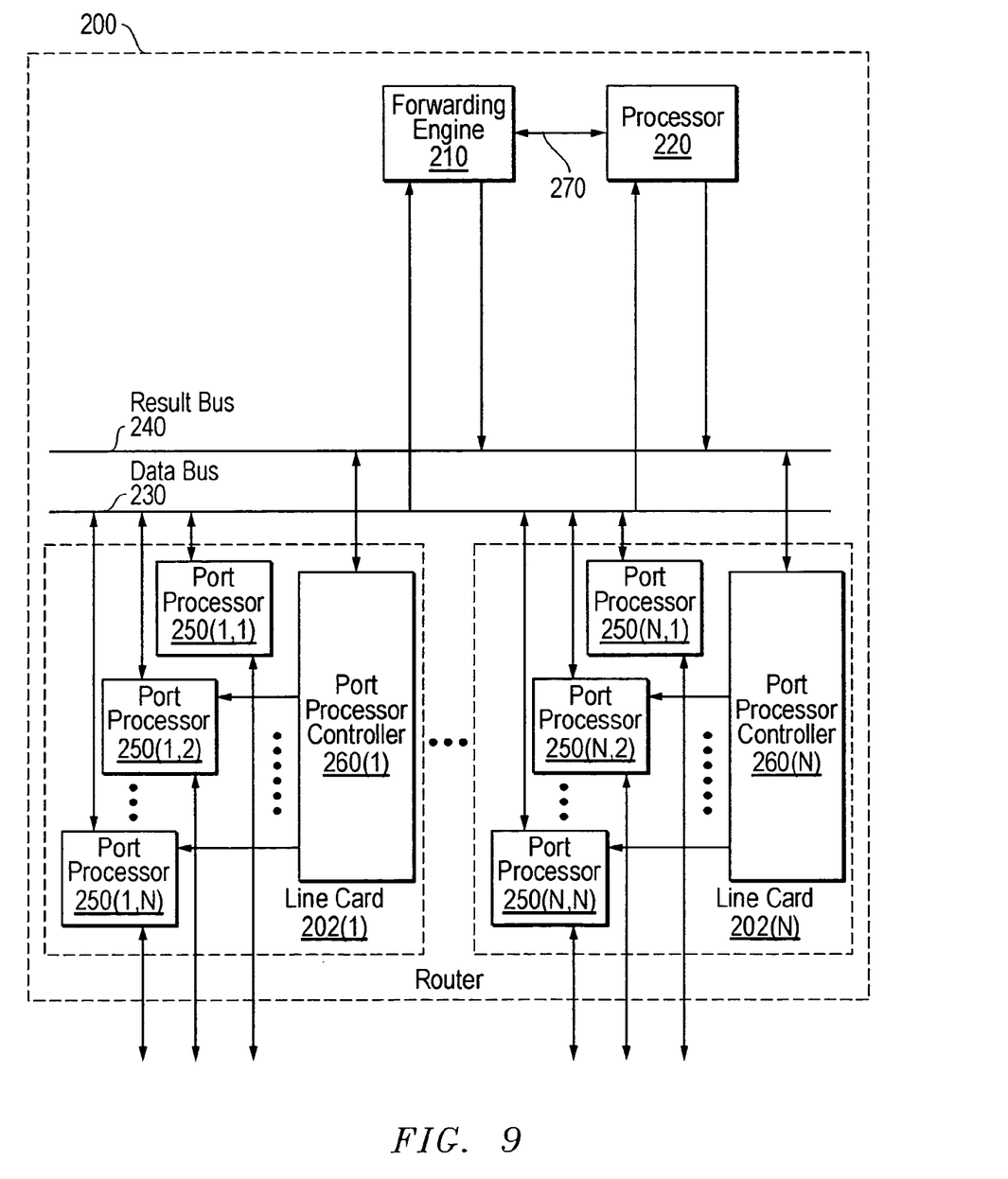
FIG. 9 illustrates relevant components of a router.

FIG. 9 is a block diagram illustrating relevant components of an exemplary router 200 that can implement one or more of the methods described above. Router 200 includes two or more line cards 202 that are communicatively coupled to a forwarding engine 210 and a processor 220 via a data bus 230 and a result bus 240. Although not shown, router 200 may include a memory for storing the active source look-up table Each of line cards 202 may include one or more port processors 250 which are controlled by port processor controllers 260. It will also be noted that forwarding engine 210 and processor 220 are not only coupled to one another via data bus 230 and result bus 240, but are also communicatively coupled to one another by a communications link 270.

When a packet is received by a line card 202, the packet may be identified and analyzed in the following manner. The packet (or some or all of its control information) is sent from the receiving port processor 250 to one or more devices coupled to data bus 230 (e.g., another port processor, forwarding engine 210 and/or processor 220). Handling of the received packet can be determined by forwarding engine 210. For example, forwarding engine 210 may determine that the received packet should be forwarded to one or more of port processors 250. This can be accomplished by indicating to corresponding one or more port processor controllers 260 that a copy of the received packet should be forwarded to one or more appropriate port processors 250.

In the foregoing process, network security information can be included in a frame sourced by router 200 in a number of ways. For example, forwarding engine 210 can be used to detect the need for the inclusion of network security information in the packet, and processor 220 can be called into service to provide the requisite network security information. This network security information can be included in the packet during the transfer of the packet's contents from one port processor 250 to another port processor 250, by processor 220 providing the requisite information directly, or via forwarding engine 210, for example. The assembled packet can thus be made to contain the requisite network security information.

In addition, or alternatively, once a packet has been identified for processing according to the present invention, forwarding engine 210, processor 220 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A non-transitory computer readable medium configured to store instructions executable by one or more processors in an edge router, wherein the one or more processors are configured to perform a method in response to executing the instructions, the method comprising an act of storing first multicast group and source addresses in an entry of a look-up table (LUT) in response to the edge router receiving a first message directly or indirectly from another edge router, wherein
the first message comprises the first multicast group and source addresses,
the first source address identifies a first source that transmits data to receivers corresponding to the first multicast group address, and
the first message indicates that the first source is active; and storing second multicast group and source addresses in another entry of the LUT in response to the edge router receiving a second message directly or indirectly from a third edge router, wherein
the second message comprises the second multicast group and source addresses, and
the second source address identifies a second source that transmits data to receivers corresponding to the second multicast group address.

2. The non-transitory computer readable medium of claim 1, wherein
the LUT is stored in memory within the edge router.

3. The non-transitory computer readable medium of claim 1, wherein the method further comprises an act of
removing or invalidating the entry from the LUT after the first source stops transmitting data to the receivers corresponding to the first multicast group address.

4. The non-transitory computer readable medium of claim 1, wherein the method further comprises an act of
removing or invalidating the entry from the LUT a period of time after the entry is stored in the LUT, wherein
the period of time is defined by a hold time value within the first message.

5. The non-transitory computer readable medium of claim 1, wherein
the first message further comprises a data transmission rate value, wherein
the data transmission rate value defines a rate at which the first source transmits data to the receivers corresponding to the first multicast group address.

6. A non-transitory computer readable medium configured to store instructions executable by one or more processors in an edge router, wherein the one or more processors are configured to perform a method in response to executing the instructions, the method comprising:
storing a first multicast group address and a first source address that corresponds to the first multicast group address in an entry of a look-up table (LUT) in response to the edge router receiving a first message directly or indirectly from another edge router, wherein
the first message comprises the first multicast group and source addresses,
the first source address identifies a first source that transmits data to receivers corresponding to the first multicast group address, and
the first message indicates that the first source is active;
obtaining the first source address from the LUT that corresponds to the first multicast group address in response to the edge router receiving a first IGMP membership report from a first device, wherein the first IGMP membership report comprises the first multicast group address but does not comprise the first source address; and generating a first PIM request to join a first multicast group identified by the first multicast group address in response to obtaining the first source address from the LUT, wherein
the first PIM request to join comprises the first source address obtained from the LUT.

7. The non-transitory computer readable medium of claim 6, wherein
the first PIM request to join further comprises the first multicast group address.

8. The non-transitory computer readable medium of claim 6, wherein the method further comprises:
receiving a second IGMP membership report from a second device, wherein
the second IGMP membership report comprises a second multicast group address;
accessing the LUT using the second multicast group address;
the LUT returning a second source address in response to accessing the LUT using the second multicast group address; and
generating and transmitting a second PIM request to join a second multicast group identified by the second multicast group address in response to the LUT returning the second source address, wherein
the second PIM request to join comprises the second multicast group address and the second source address.

9. The non-transitory computer readable medium of claim 6, wherein the LUT is stored in memory within the edge router.

10. The non-transitory computer readable medium of claim 6, wherein the method further comprises an act of
removing or invalidating the entry from the LUT after the first source stops transmitting data to the receivers corresponding to the first multicast group address.

11. The non-transitory computer readable medium of claim 6, wherein the method further comprises an act of
removing or invalidating the entry from the LUT a period of time after the entry is stored in the LUT, wherein the period of time is defined by a hold time value within the first message.

12. The non-transitory computer readable medium of claim 6, wherein
the first message further comprises a data transmission rate value, wherein the data transmission rate value defines a rate at which the first source transmits data to the receivers corresponding to the first multicast group address.

13. A method comprising:
an edge router storing first multicast group and source addresses in an entry of a look-up table (LUT) in response to the edge router receiving a first message directly or indirectly from another edge router, wherein
the first message comprises the first multicast group and source addresses,
the first source address identifies a first source that transmits data to receivers corresponding to the first multicast group address, and
the first message indicates that the first source is active; and
the edge router storing second multicast group and source addresses in another entry of the LUT in response to the edge router receiving a second message directly or indirectly from a third edge router, wherein
the second message comprises the second multicast group and source addresses, and
the second source address identifies a second source that transmits data to receivers corresponding to the second multicast group address.

14. The method of claim 13 further comprising an act of
removing or invalidating the entry from the LUT after the first source stops transmitting data to the receivers corresponding to the first multicast group address.

15. The method of claim 13 further comprising an act of
removing or invalidating the entry from the LUT a period of time after the entry is stored in the LUT, wherein
the period of time is defined by a hold time value within the first message.

16. The method of claim 13, wherein the first message further comprises
a data transmission rate value, wherein
the data transmission rate value defines a rate at which the first source transmits data to the receivers corresponding to the first multicast group address.

17. A method comprising:
an edge router storing a first multicast group address and a first source address that corresponds to the first multicast group address in an entry of a look-up table (LUT) in response to the edge router receiving a first message directly or indirectly from another edge router, wherein
the first message comprises the first multicast group and source addresses,
the first source address identifies a first source that transmits data to receivers corresponding to the first multicast group address, and
the first message indicates that the first source is active;
the edge router obtaining the first source address from the LUT that corresponds to the first multicast group address, in response to the edge router receiving a first IGMP membership report from a first device, wherein
the first IGMP membership report comprises the first multicast group address but does not comprise the first source address; and
the edge router generating a first PIM request to join a first multicast group identified by the first multicast group address in response to obtaining the first source address from the LUT, wherein
the first PIM request to join comprises the first source address obtained from the LUT.

18. The method of claim 17, wherein
the first PIM request to join further comprises the first multicast group address.

19. The method of claim 17 further comprising:
receiving a second IGMP membership report from a second device, wherein
the second IGMP membership report comprises a second multicast group address;
accessing the LUT using the second multicast group address;
the LUT returning a second source address in response to accessing the LUT using the second multicast group address; and
generating and transmitting a second PIM request to join a second multicast group identified by the second multicast group address in response to the LUT returning the address of the second source, wherein
the second PIM request to join comprises the addresses of the second multicast group and the second source.

20. An apparatus comprising:
an edge router coupled to an SM network and a device;
wherein the edge router comprises one or more microprocessors and a memory for storing instructions executable by the one or more processors, wherein
the one or more processors implement a method in response to executing the instructions, the method comprising:
storing a first multicast group address and a first source address that corresponds to the first multicast group address in an entry of a look-up table (LUT) in response to the edge router receiving a first message directly or indirectly from another edge router, wherein
the first message comprises the first multicast group and source addresses,
the first source address identifies a first source that transmits data to receivers corresponding to the first multicast group address, and
the first message indicates that the first source is active;
obtaining the first source address from the LUT that corresponds to the first multicast group address, in response to the edge router receiving a first IGMP membership report from a first device, wherein
the first IGMP membership report comprises the address of the first multicast group but does not comprise the address of the first source; and
generating a PIM request to join a first multicast group identified by the first multicast group address in response to obtaining the address of the first source from the LUT.

21. The method of claim 20, wherein
the PIM request to join further comprises the first multicast group address and the first source address.

22. The method of claim 20 further comprising:
receiving a second IGMP membership report from a second device, wherein
the second IGMP membership report comprises a second multicast group address;
accessing the LUT using the second multicast group address;
the LUT returning an address of a second source in response to accessing the LUT using the second multicast group address; and
generating and transmitting a second PIM request to join a second multicast group identified by the second multicast group address in response to the LUT returning the address of the second source, wherein
the second PIM request comprises the addresses of the second multicast group and the second source.

23. The method of claim 20 further comprising an act of
removing or invalidating the entry from the LUT after the first source stops transmitting data to the receivers corresponding to the first multicast group address.

24. The method of claim 20 further comprising an act of
removing or invalidating the entry from the LUT a period of time after the entry is stored in the LUT, wherein
the period of time is defined by a hold time value within the first message.

25. The method of claim 20, wherein
the first message further comprises a data transmission rate value, wherein
the data transmission rate value defines a rate at which the first source transmits data to the receivers corresponding to the first multicast group address.

26. An apparatus comprising:
an edge router coupled to a SM network and a device;
means for storing first multicast group and source addresses in an entry of a look-up table (LUT) in response to the edge router receiving a first message directly or indirectly from another edge router, wherein
the first message comprises the first multicast group and source addresses,
the first source address identifies a first source that transmits data to receivers corresponding to the first multicast group address, and
the first message indicates that the first source is active; and
secondary means for storing second multicast group and source addresses in another entry of the LUT in response to the edge router receiving a second message directly or indirectly from a third edge router, wherein
the second message comprises the second multicast group and source addresses, and
the second source address identifies a second source that transmits data to receivers corresponding to the second multicast group address.

27. A method comprising:
an edge router storing first multicast group and source addresses in an entry of a look-up table (LUT) in response to the edge router receiving a first message directly or indirectly from another edge router, wherein
the first message comprises the first multicast group and source addresses,
the first source address identifies a first source that transmits data to receivers corresponding to the first multicast group address, and
the first message indicates the first source is active;
removing or invalidating the entry from the LUT upon the expiration of a period of time that begins when the entry is stored in the LUT, wherein
the period of time is defined by a hold time value within the first message; and
the edge router storing second multicast group and source addresses in another entry of the LUT in response to the edge router receiving a second message directly or indirectly from a third edge router, wherein
the second message comprises the second multicast group and source addresses,
the second source address identifies a second source that transmits data to receivers corresponding to the second multicast group address.

28. The method of claim 27 further comprising an act of
removing or invalidating the second entry from the LUT after the second source stops transmitting data to the receivers corresponding to the second multicast group address.

29. The method of claim 27, wherein the first message further comprises
a data transmission rate value, wherein
the data transmission rate value defines a rate at which the first source transmits data to the receivers corresponding to the first multicast group address.

* * * * *